United States Patent [19]

Puisais et al.

[11] Patent Number: 4,644,132

[45] Date of Patent: Feb. 17, 1987

[54] APPARATUS FOR HORIZONTALLY SUPPORTING PIPES TO BE BUTT WELDED

[75] Inventors: Xavier Puisais, Levallois Perret; Jean-Pierre Hamon, Cergy; Michel Jegousse, Saint-Herblain; Michel Kaluszynski, Vitry-Su-Seine, all of France

[73] Assignee: Total Compagnie Francaise des Petroles, Paris, France

[21] Appl. No.: 785,698

[22] Filed: Oct. 9, 1985

[30] Foreign Application Priority Data

Oct. 22, 1984 [FR] France .................. 84 16113

[51] Int. Cl.⁴ .................. B21J 13/08; H05B 1/00
[52] U.S. Cl. .................. 219/158; 219/59.1; 219/125.1
[58] Field of Search .................. 219/60 R, 60 A, 125.1, 219/158, 269, 59.1, 57; 405/154, 158

[56] References Cited

U.S. PATENT DOCUMENTS 1,910,259  5/1933  Raymond .................. 219/158
4,355,925 10/1982  Rognoni .................. 405/158

FOREIGN PATENT DOCUMENTS 140139   9/1979  Fed. Rep. of Germany ...... 405/154
0050982  4/1980  Japan .................. 219/59.1
169446   2/1970  Netherlands .................. 405/154
929997   6/1963  United Kingdom .

Primary Examiner—E. A. Goldberg
Assistant Examiner—Lincoln D. Donovan
Attorney, Agent, or Firm—Sughrue, Mion, Zinn, Macpeak and Seas

[57] ABSTRACT

Apparatus for supporting a tubular element 24 to be butt joined horizontally at one of its ends to a tubular structure 27, comprises an upwardly acting, vertical hydraulic thrust jack 9 which compensates at least partly for the weight of the tubular element and which is placed towards the other end of the tubular element. The thrust jack is pivoted at its upper end on a slide 11 which is vertically movable and carries support members 23 for supporting the tubular element, and at its lower end on a base 6 mounted on a lower frame 2 provided with wheels 3 adapted to run on rails 4.

7 Claims, 4 Drawing Figures

APPARATUS FOR HORIZONTALLY SUPPORTING PIPES TO BE BUTT WELDED

BACKGROUND OF THE INVENTION

The present invention relates to the supporting of a tubular element to be butt joined horizontally, for example by welding, to a tubular structure. The tubular structure may be another tubular element or comprise a succession of tubular elements previously butt joined together. In particular, the tubular structure may be a pipeline in the process of being laid on the bottom of a stretch of water by the so-called "S laying" method, additional tubular elements being added successively to the pipeline on a floating platform as the laying of the pipeline proceeds.

Butt joining a tubular element to a tubular structure, such as by electron-beam welding, requires the plane end surface of the element and of the structure to be strictly applied against each other. The butting of the tubular element against the tubular structure requires the exertion of a very considerable aligning moment due to the weight of the tubular element. With the heaviest tubular elements this moment becomes excessive and cannot be exerted solely by the butting means which in practice can be installed on each side of the zone to be welded.

SUMMARY OF THE INVENTION

According to the invention there is provided apparatus for supporting a tubular element to be butt joined horizontally at one end to a tubular structure, comprising thrust means for exerting an upwardly directed thrust of sufficient force to at least partly compensate for the weight of the tubular element, and for placement, in use, in a position horizontally remote from the one end of the tubular element.

The thrust means may comprise a substantially vertical hydraulic jack.

When the joining is effected using a joining machine mounted on a first carriage, the support apparatus may include a second carriage which is connected by at least one coupling rod to the first carriage, so that the alignment moment exerted by the support apparatus will not be modified by displacement of the support apparatus relative to the first carriage.

BRIEF DESCRIPTION OF THE DRAWINGS

In the drawings:

FIG. 3 is a partial section on the line 3—3 in FIG. 1; and

DETAILED DESCRIPTION OF THE PREFERRED EMBODIMENT

Figure 1:
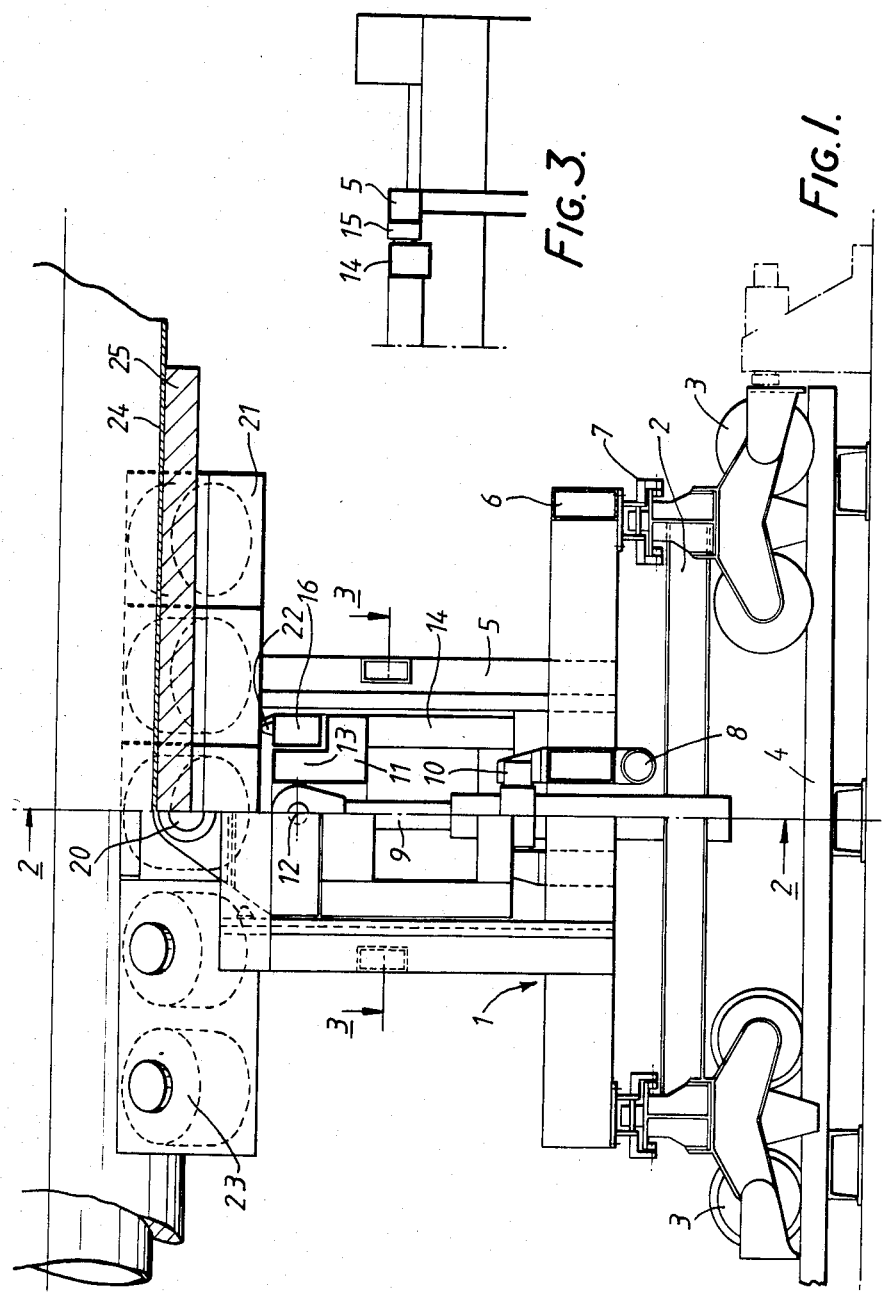
FIG. 1 is a front view in elevation of an embodiment of the invention in the form of a compensating carriage, in half-section on the line 1—1 in FIG. 2.
Figure 2:
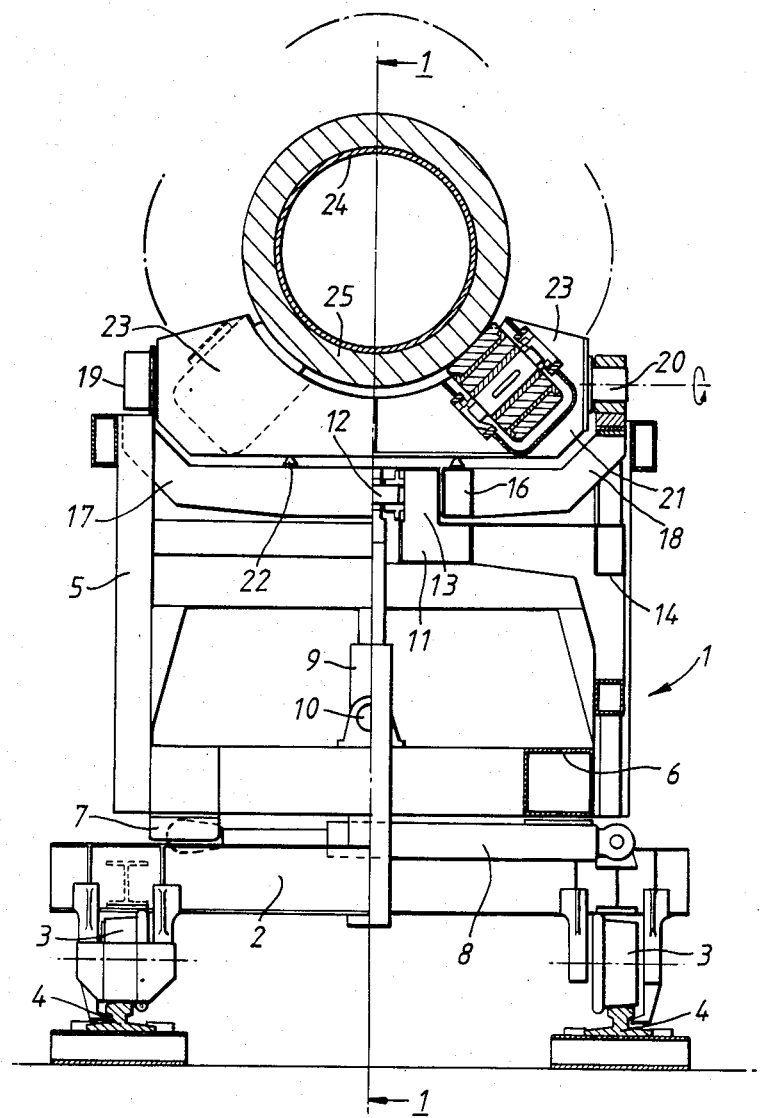
FIG. 2 is a side view of the compensating carriage of FIG. 1 in half-section on the line 2—2 in FIG. 1.

As shown in FIGS. 1 and 2, the compensating carriage 1 comprises a lower frame 2 mounted on wheels 3 adapted to run on rails 4, and an upper structure 5 resting by means of a base 6 on the frame 2 with the aid of rollers 7 and adjustable in the transverse direction by at least one transverse jack 8.

The top structure 5 has a central generally vertical hydraulic jack 9 pivoted at its lower end on the base 6 of the structure 5 about a longitudinal horizontal pivot axis 10 (the longitudinal direction being parallel to that of the rails 4 and at right angles to the axis of the wheels 3), and at its upper end on a slide 11 about a transverse horizontal pivot axis 12. The slide 11 comprises a central upper part 13 which surrounds the upper part of the jack 9 and in which the axis 12 is situated, and a lower part 14 which is horizontally remote from the jack 9, the lower part extending vertically and being slidable vertically between slide guides, such as the vertical slide guides 15 shown in FIG. 3.

The upper part 13 of the slide 11 forms a step bearing for a ring 16 fixed to two transverse arms 17, 18, each provided with a pivoting means 19, 20 having a horizontal transverse pivot axis. The pivoting means 19, 20 carry a platform 21. Between the platform 21 and the ring 16 are disposed elastically compressible member 22.

The platform 21 carries two longitudinal rows of support members comprising rollers 23, the axes of the rollers of the respective rows converging (in a side view such as that shown in FIG. 2) at a line in a vertical plane including the vertical axis of the hydraulic jack 9, the rollers of one and the same row having their median circumferences situated in the same plane and the two planes defined by the two rows being diametrical planes for a tubular element such as the element 24, covered with a concrete casing 25 supported on its lower surface by the two rows of rollers 23.

The upwardly directed thrust exerted on the tubular element 24 by the compensating carriage 1 is adjustable by regulating the pressure of the hydraulic fluid supplied to the hydraulic jack 9. The pressure regulating means are not shown because they are well known. If it is desired to exactly compensate for the weight of the tubular element 24, a "weighing" is first made of the element 24 in order to determine the value of the hydraulic pressure in the jack 9 which exactly balances the effect of the weight of the tubular element 24. The hydraulic pressure in the jack 9 is then kept at that value. After the tubular element 24 has been butted against the tubular structure, the jack 9 is locked in position during the operation of fixing the element to the structure.

Figure 4:
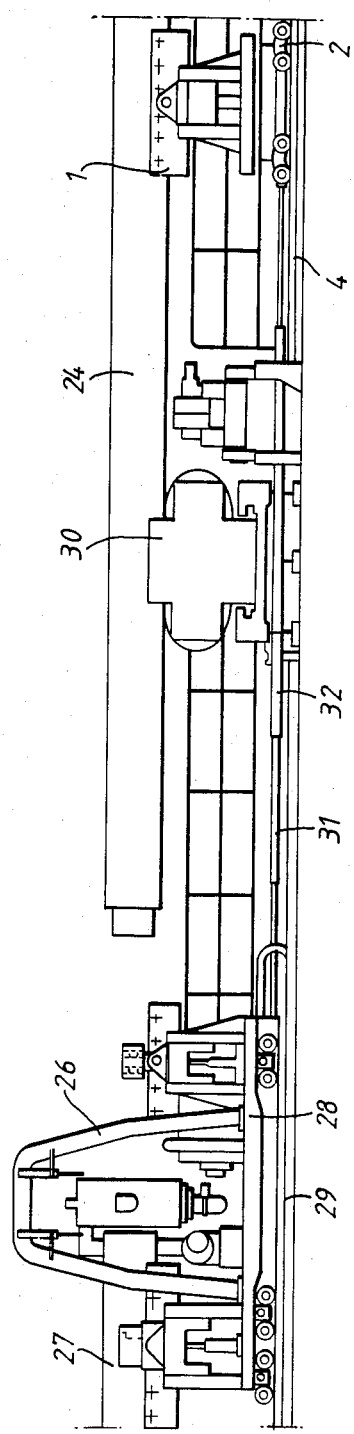
FIG. 4 is a view in elevation of the compensating carriage of FIG. 1 and of a joining machine.

FIG. 4 shows a machine 26 for joining a tubular element 24 to a tubular structure 27. The joining machine 26 may be an external welding machine having means for butting the tubular element 24 against the tubular structure 27, the butting means being either external or internal, or it may comprise external butting means with the actual welding machine disposed inside the tubular element 24 and the tubular structure 27. The joining machine 26 is mounted on a carriage 28 running on rails 29, these rails being in line with the rails 4 on which the compensating carriage 1 runs.

Between the joining machine 26 and the compensating carriage 1, an intermediate support 30 is provided including means for driving it in the longitudinal direction of the tubular element 24. The intermediate support 30, unlike the compensating carriage 1, does not participate in any upward aligning movement of the tubular element 24 during butting against the tubular structure 27.

The compensating carriage 1 is connected to the carriage 28 by at least one coupling rod 31 provided with means 32 for regulating its length in order to adjust the distance between the carriages 1 and 28 in accordance with the particular tubular elements 24 used, the compensating carriage 1 being arranged to support the tubular element 24 at a point remote from the end of the tubular element being joined by the joining machine 26 to the tubular structure.

There is thus provided support apparatus whereby the influence of the weight of the tubular element, in the butting effected with the tubular element disposed substantially horizontally, can be eliminated or at least greatly reduced.

What is claimed is:

1. Apparatus for circumferentially butt welding a substantially horizontal tubular element (24) at one end thereof to a tubular structure (27), comprising: a welding machine (26) located near said one end for butting said one end against the tubular structure and welding such element and structure together, and support means (1) for supporting the tubular element at a position horizontally remote from said one end, said support means comprising thrust means (9) for exerting an upwardly directed thrust on the tubular element of sufficient force to at least partly compensate for the weight of the tubular element and thus alleviate the force to be exerted by said welding machine.

2. Apparatus according to claim 1, wherein said thrust means comprises a generally vertical hydraulic jack.

3. Apparatus according to claim 2, wherein said hydraulic jack is pivoted (10) at its lower end on a base (6) and pivoted (12) at its upper end on a vertically displaceable slide member (11), said slide member carrying support members (23) adapted to bear against a lower surface of the tubular element.

4. Apparatus according to claim 3, wherein said support members are mounted on a platform (21) which is pivoted between arms (17, 18) fixed to a ring (16) resting on a central portion of the slide and surrounding the jack axis, said platform pivoting about a horizontal axis (19, 20) transverse to the longitudinal direction of the tubular element when it rests on said support members.

5. Apparatus according to claim 3, wherein said base is mounted on a lower frame (2) provided with wheels (3) adapted to run on rails (4).

6. Apparatus according to claim 5, including a horizontal jack (8) parallel to the axes of said wheels and mounted between said lower frame and said base.

7. Apparatus according to claim 5, wherein said welding machine is mounted on a carriage (28), and wherein at least one coupling rod (31, 32) connects said carriage to said lower frame.

* * * * *